United States Patent Office 2,905,270
Patented Sept. 22, 1959

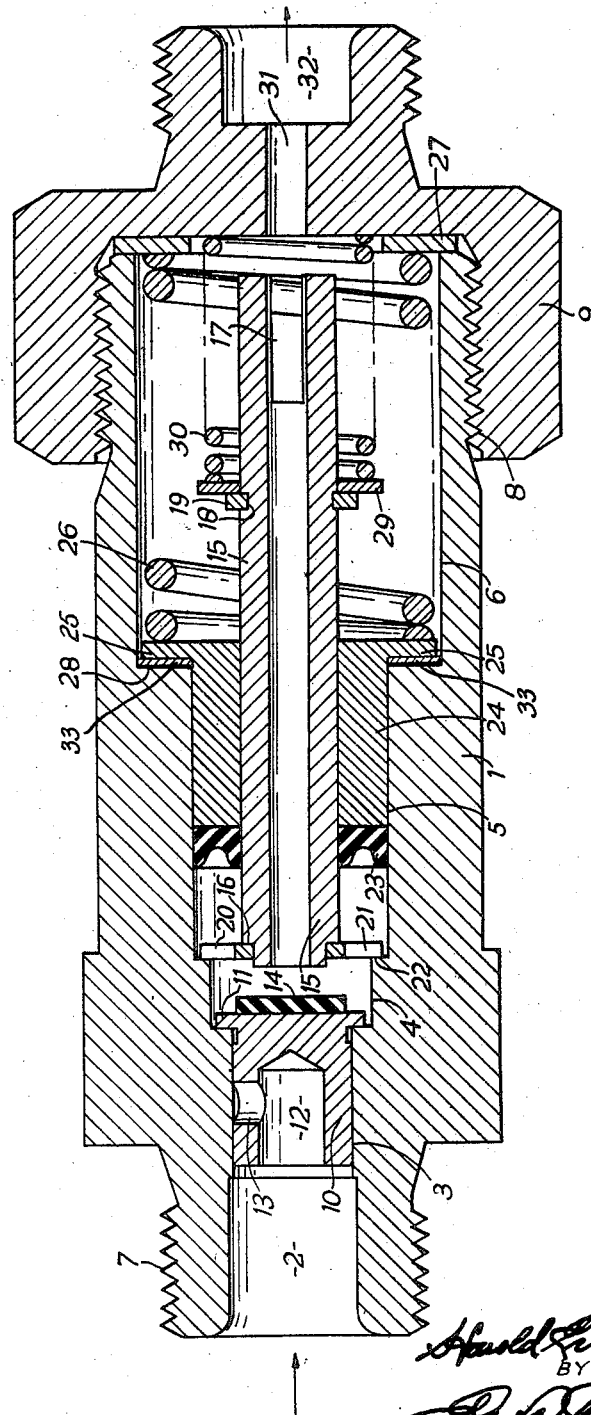

2,905,270

SINGLE LINE LUBRICANT INJECTORS

Harold Ernest Jackson, Plympton St. Maurice, Devon, England, assignor to Tecalemit Limited, Brentford, England Application September 4, 1957, Serial No. 682,047

Claims priority, application Great Britain September 5, 1956

5 Claims. (Cl. 184—7)

This invention relates to a single line lubricant or liquid injector.

The object of the invention is to provide a lubricant or liquid injector which is cheap to manufacture and contains a minimum of moving parts, which may be manufactured within wide tolerances and which, therefore, is less likely to seize than lubricant injectors of known types. Hereinafter, lubricant and liquid will be referred to as "grease."

The injector forming the subject of the present invention is intended to provide measured shots of grease when it is connected to a source of grease supply which may be alternately put under pressure and released from pressure.

The present invention resides in the novel organization and operation of the parts and elements hereinafter more fully described and which permit the attainment of the object of this invention.

Other objects and advantages of this invention will be apparent as the detailed description of the invention proceeds.

One constructional form of the invention will now be described by way of example with reference to the accompanying drawing and, in the description, it will be assumed that the injector is arranged horizontally. The injector comprises a body 1, which may be formed from hexagonal bar stock, and is provided with four coaxial bores 3, 4, 5 and 6 of progressively larger diameters and communicating at their adjacent ends a bore 2 forming the inlet being at the left hand end of the body 1, as shown in the drawing, and communicating with the bore 3. The body is formed at its left hand end with an external screw thread 7 to connect the inlet 2 to a source of grease supply (not shown), and at its right hand end the body is formed with an external thread 8 to receive a cap 9 having a centrally disposed discharge port 31 therein.

Within the bore 3 which forms cylindrical valve housing, there is freely slidable a cylindrical valve 10 having a circumferential flange 11 at its right hand end (as shown in the drawing) furthest from the source of lubricant supply and is disposed in the next adjacent bore or compartment 4 to abut a shoulder formed therebetween for limiting the closing movement of said valve member, as shown, to its fully closed position. The valve is centrally drilled axially from its outer end on its inlet side for approximately half its length to form a passage 12 and is provided with a transverse transfer port 13 extending from the passage 12 to the outer periphery of the valve. A lubricant sealing disc 14 of flexible material is secured to the end face of the valve 10 adjacent said flange 11—that is, on the outlet side of the valve.

Centrally arranged within the cylinder bore 5, with which the chamber 4 communicates, there is a transfer tube 15 formed with an external circular shoulder 16 at its end which opens into the chamber 4, i.e. the left hand end in the drawing. The transfer tube also extends into the bore 6, which forms a spring chamber with which the cylinder bore 5 communicates, and is of a length to abut against the cap 9 and surround its discharge port 31, when the transfer port 13 in the valve 10 communicates with chamber 4. The end of tube 15, which contacts the cap 9, is formed with a slot 17 in its side wall and extends axially for a short distance from said end to communicate the chamber 6 with the discharge port 37 in the cap 9, when said end of the tube abuts the cap. The tube is provided at a position approximately one third of its length from its right hand end with a groove 18 in which a metal circular clip 19 is fitted.

A circular metal stop plate or disc 20, formed with a series of peripheral slots 21 for the passage of lubricant, is arranged between the shoulder 16 on the other or left hand end of the transfer tube and a shoulder 22 formed at the left hand end of the cylinder bore 5. An annular, cup-shaped lubricant sealing ring 23 of elastic material is slidably arranged around the transfer tube 15 towards the left hand end of the latter and is in sliding contact with the wall of the bore 5. A hollow piston 24 is also arranged around the transfer tube towards the right hand end of the bore 5, the piston having an external flange 25 at its right hand end which is arranged in the spring chamber 6. One end of a large coil spring 26, which is arranged in the spring chamber 6, bears against a washer 27. The washer 27 may be of metal or of flexible material and forms a lubricant seal between the right hand end of the body 1 and the cap 9. The opposite end of the spring 26 bears against the flange 25 of the piston 24 and acts to hold the flange normally against the shoulder 28 formed at the left hand end of the spring chamber 6. A metal washer 29 is arranged around the transfer tube and abuts against the above mentioned circular clip 19 and provides an abutment for one end of a second coil spring 30 which at its opposite end bears against the inner surface of the cap 9, the spring 30 being of less diameter than spring 26 and being surrounded by the latter. The cap 9 may be formed from hexagonal bar stock and has its skirt-flange internally to thread upon the threaded end 8 of the body 1 to close the outer end of chamber 6; and it is provided with a centrally-arranged outward extension having a grease outlet port 31 which provides communication between the spring chamber 6 and a grease discharge outlet 32 formed in the shank at its outer end.

Assuming that all the parts of the injector in the body are in their left hand positions, as shown in the drawing, and that all spaces in the body 1 are charged with grease, grease entering the inlet 2 from the source of supply of grease under pressure will move the valve 10 to the right in the valve housing 3 until the sealing disc 14 on the valve abuts against the left hand end face of the transfer tube 15. The disc thus seals off the bore of the tube and the pressure from the supply source continues to move the valve 10 and, hence, the tube to the right against the action of the smaller coil spring 30 until the transverse port 13 in the valve 10 has reached the shoulder at the left hand end of the chamber 4 and the port 13 opens thereinto. At this point, the right hand end of tube 15 has abutted against the cap 9. Grease may now flow into the chamber 4 via the port 13 in the valve and into the cylinder bore 5 via the slots 21 in the metal stop plate 20 and may thus move the sealing disc 23 and the piston 24, which are arranged on the transfer tube 15, to the right until the larger coil spring 26 is fully compressed and, in so doing, displacing a quantity of grease from the spring chamber 6 through the slot 17 in the tube 15 and, thence, via the grease outlet port 31 to the grease outlet 32, thus completing one injection cycle.

When grease delivery pressure is released within the supply line connected to the inlet 2, the transfer tube 15 returns to the left to its original position under the action of the smaller coil spring 30 moving the valve 10 with it. The grease, which is now within the chamber 4 and the cylinder bore 5, is under the pressure of the larger coil spring 26 and, when the disc 20 abuts the shoulder 22 arresting movement of the tube 15, this pressure acts upon the flanged end 11 of the valve 10 and separates the valve 10 and its sealing disc 14 from the left hand end face of the transfer tube and causes the valve to move further to the left to the position shown in the drawing so that the transverse port 13 in the valve will now be entirely within the housing 3. This allows the grease within the chamber 4 and the cylinder bore 5 to pass through the transfer tube and its slot 17 into the spring chamber 6 until such time as the piston 24, together with its sealing disc 23, are again actuated by the grease, under pressure, from the source of supply (not shown). This completes a complete cycle of operation of the device.

It will be appreciated that in order to decrease the output of the injector any desired number of washers 33 may be arranged between the shoulder 28 at the left hand end of the spring housing 6 and the flange portion 25 of the piston 24 thus limiting the stroke of the piston toward the inlet opening 2 under the bias of the spring 26.

Having thus described the invention and the manner in which the same performs, it is to be understood that the above description is to one embodiment of the same as shown and described by me, but may be varied or modified within the scope of the appended claims.

That which is claimed, as new and to be secured by Letters Patent, is:

1. A lubricant injector for discharging measured amounts of lubricant from a source of supply which is alternately under pressure and released from said pressure, said injector comprising a body member having a chamber therein provided with an inlet opening and an outlet opening, a tubular passage between the inlet opening and said chamber forming a valve housing, a valve member slidably fitting in said valve housing and freely reciprocal therein and having means for limiting the movement of said valve member toward said inlet opening, said valve member having a grease duct therein communicating with said inlet and provided with a port positioned for communicating said duct with said chamber, when the valve member is moved a distance toward said chamber by lubricant under pressure entering said inlet, and conversely; an open-ended tube slidably mounted in said chamber and extending between said valve member and said outlet opening with its end adjacent said valve member normally spaced therefrom and adapted to be contacted and closed by the valve member, when the latter is moved to its open position, the other end of said tube being aligned with the outlet opening, the tube being of such length that, when contacted by said valve member, the lubricant under pressure moving said valve member moves said tube in aligned communication with said outlet and limiting the inward movement of said valve member, biasing means for moving said tube axially in the opposite direction, when the lubricant under pressure is relieved from said inlet opening, means for limiting said last mentioned movement of said tube; a piston slidably mounted in said chamber, means normally biasing said piston toward said inlet opening and including means for limiting its biased movement to provide a space between it and said valve member; apertures disposed in said tube between said piston and said outlet opening, whereby, when lubricant under pressure is admitted at the inlet opening, the valve member moves inwardly of its casing and contacts and closes the adjacent end of the tube and, then moves the tube therewith to communicate the tube with the outlet opening, during which time the valve port is unmasked by its housing and communicates with said chamber on the inlet side of said piston, and the lubricant under pressure thus admitted forces said piston against its bias to discharge a charge of lubricant on the outlet side thereof through said apertures in the tube and through said outlet opening; and whereby, when the lubricant under pressure is relieved at the inlet opening, the tube is actuated under its bias and partially returns the valve member to its closed position to mask said port therein and the piston, operating under its bias, forces the lubricant between it and the valve member, first to separate the valve member from the end of said tube and fully close the valve member, and then, to force the lubricant between the piston and the valve member through the inner open end of the tube and its said apertures into the chamber between said piston and said outlet to provide the next measured charge of lubricant to be discharged through said outlet opening.

2. The subject matter of claim 1 wherein the piston slidably surrounds said tube, and wherein a sealing member is arranged on said piston between said body and said tube, said biasing means for said tube and piston being helical springs, respectively, disposed in the chamber with one of their ends bearing against an end wall of the chamber surrounding said outlet and their other ends bearing against said piston and tube, respectively.

3. The subject matter of claim 1 wherein washers are inserted between the piston and its limiting means for decreasing the amount of output of the injector and its outlet opening.

4. In a lubricant injector device discharging measured amounts of lubricant from a source of supply, under pressure, supplied to and released from said injector alternatively, the combination with a chambered body member having an inlet opening and an outlet opening and a pressure actuated lubricant discharging means therein normally positioned to divide the chamber between said openings into a lubricant inlet compartment and a lubricant charge-retaining compartment on opposite sides of said discharging means, and means biasing said discharge means to its normal position; of a control means at the inlet opening actuated by the lubricant under pressure applied to said inlet opening for controlling the admittance of lubricant under pressure to the lubricant inlet compartment on the inlet side of said discharge means, a normally based tube open at its end portions and having said end portions extending into said compartments, respectively, with the end portion adjacent said control means normally assuming a position spaced from said control means and yieldable to the movement of said latter means so that the control means first closes the opening in said tube, when actuated by lubricant under pressure admitted at the inlet opening, and then admits said lubricant under pressure to said inlet compartment to actuate said discharge means to discharge lubricant, previously supplied to the charge retaining compartment, through said outlet side, whereby, when the lubricant under pressure is released from the inlet opening, the end of the tube adjacent the control means is returned to its normal position under the influence of the bias on the tube to move the control means to cut off communication between said inlet opening and the inlet compartment, and the return movement of said lubricant discharge means, acting under the influence of its bias upon the lubricant in the inlet compartment and moving the control means to open the end of said tube, forces said lubricant from said inlet compartment through the tube into the charge retaining compartment.

5. A lubricant injector for discharging measured amounts of lubricant from a source of supply which is alternately under pressure and released from said pressure, said injector comprising a tubular body momber having an inlet opening at one end and an outlet opening at its other end and, further, having a series of chambers extending coaxially therein and opening into each other at their adjacent ends, said chambers being of progressively larger diameters from said inlet opening and forming shoulders at their adjacent ends; one of said chambers forming a valve housing between said inlet opening and the next adjacent chamber; a valve member slidably fitted in said valve housing and freely reciprocal therein and having means thereon lying within said next adjacent chamber and engagable with the first of said shoulders to limit the movement of said valve member toward said inlet opening, said valve member having a duct therein communicating with said inlet opening and provided with a port positioned for communicating said duct with said next adjacent chamber when the valve member is moved a distance inwardly of said body by said lubricant under pressure entering said inlet, and conversely; an open-ended tube slidably mounted within said chambered body and extending between said valve member and said outlet opening and having ports therein disposed at and inwardly of its open end adjacent said outlet opening, biasing means normally urging said tube toward said valve member, stop means on said tube and engagable with the second of said shoulders to maintain its end adjacent said valve member spaced normally from said valve member, said spacing being such that said open end of the tube is contacted and closed by the valve member, when the latter is moved to its open position, the other open end of said tube being aligned with the outlet opening and said tube being of such length that, when contacted by said valve member, the lubricant under pressure, moving the valve member, moves said other open end of the tube in direct communication with said outlet opening and limits the inward movement of said valve member in opened position; and a piston slidably disposed in a next intermediate of said chambers and having a flange-like portion slidably disposed in the chamber adjacent the outlet opening, means normally biasing said piston toward said inlet opening and to move its flange-like portion against an adjacent shoulder to limit said movement for providing a space between the piston and said valve member at all times.

References Cited in the file of this patent

UNITED STATES PATENTS

| | | |
|---|---|---|
| 1,496,947 | Robinson | June 10, 1924 |
| 2,012,724 | Manzel | Aug. 27, 1935 |
| 2,115,637 | Leonard | Apr. 26, 1938 |
| 2,122,177 | Klein | June 28, 1938 |
| 2,516,427 | Schweisthal | July 25, 1950 |
| 2,637,413 | Fox | May 5, 1953 |